(12) United States Patent
Honda

(10) Patent No.: US 12,639,458 B2
(45) Date of Patent: May 26, 2026

(54) IMAGE FORMING SYSTEM, IMAGE FORMING APPARATUS, IMAGE FORMING METHOD, AND NON-TRANSITORY STORAGE MEDIUM

(71) Applicant: CANON KABUSHIKI KAISHA, Tokyo (JP)

(72) Inventor: Kinya Honda, Chiba (JP)

(73) Assignee: Canon Kabushiki Kaisha, Tokyo (JP)

( * ) Notice: Subject to any disclaimer, the term of this patent is extended or adjusted under 35 U.S.C. 154(b) by 297 days.

(21) Appl. No.: 18/298,237

(22) Filed: Apr. 10, 2023

(65) Prior Publication Data

US 2023/0359752 A1 Nov. 9, 2023

(30) Foreign Application Priority Data

May 9, 2022 (JP) ................................ 2022-076963

(51) Int. Cl.
*G06F 21/62* (2013.01)
*G06F 21/60* (2013.01)
(52) U.S. Cl.
CPC ........ *G06F 21/6209* (2013.01); *G06F 21/604* (2013.01); *G06F 21/608* (2013.01)
(58) Field of Classification Search
CPC ... G06F 21/6209; G06F 21/604; G06F 21/608
See application file for complete search history.

(56) References Cited

U.S. PATENT DOCUMENTS

| | | | | |
|---|---|---|---|---|
| 6,785,017 | B1 * | 8/2004 | Yoshiura | H04N 1/32614 |
| | | | | 358/437 |
| 6,971,007 | B1 * | 11/2005 | Currans | G06F 21/608 |
| | | | | 358/1.11 |
| 2002/0140958 | A1 * | 10/2002 | Lester | G06F 3/1288 |
| | | | | 358/1.13 |
| 2006/0020859 | A1 * | 1/2006 | Adams | H04L 63/0428 |
| | | | | 714/48 |
| 2006/0242558 | A1 * | 10/2006 | Racovolis | G06F 40/169 |
| | | | | 715/205 |
| 2012/0203789 | A1 * | 8/2012 | Oishi | G06F 16/84 |
| | | | | 707/754 |
| 2018/0150619 | A1 * | 5/2018 | Condon | G06F 21/10 |

FOREIGN PATENT DOCUMENTS

| | | |
|---|---|---|
| JP | 2007257527 A | 10/2007 |
| JP | 2009160848 A | 7/2009 |
| JP | 2010130502 A | 6/2010 |

* cited by examiner

*Primary Examiner* — Vance M Little
(74) *Attorney, Agent, or Firm* — Canon U.S.A., Inc. IP Division

(57) ABSTRACT

An image forming system comprises an acquisition unit configured to acquire a printing target file that can be partially encrypted; a notification unit configured to give a notification in a case where an encrypted portion of the printing target file cannot be opened; and a printing unit configured to print an image based on the printing target file not under control of a printer driver.

19 Claims, 15 Drawing Sheets

FIG.11A
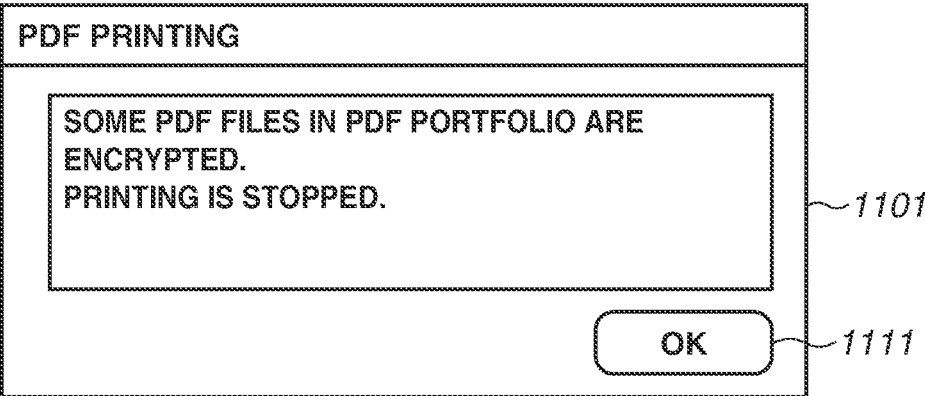
PDF PRINTING
SOME PDF FILES IN PDF PORTFOLIO ARE ENCRYPTED.
PRINTING IS STOPPED.
~1101
OK ~1111
FIG.11B
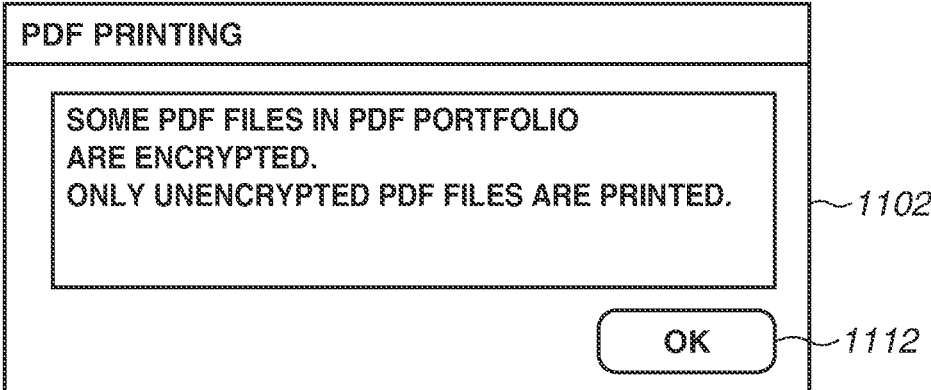
PDF PRINTING
SOME PDF FILES IN PDF PORTFOLIO
ARE ENCRYPTED.
ONLY UNENCRYPTED PDF FILES ARE PRINTED.
~1102
OK ~1112
FIG.11C
PDF PRINTING
PASSWORD IS SET FOR SOME PAGES.
⌐1113a
☐ INPUT PASSWORD: ⌐1114 [**********]    ~1103
⌐1113b
☐ CANCEL PRINTING
⌐1113c
☐ PRINT ONLY PAGES WITHOUT PASSWORDS
⌐1115        ⌐1116
OK        CANCEL

START

S1501

USER CONNECTS USB
MEDIUM TO PRINTER AND
SELECTS MEDIUM PRINTING

S1502

DISPLAY FILES IN MEDIUM

S1503

SPECIFY FILE TO BE PRINTED AND
GIVE INSTRUCTION TO PRINT FILE

S902

IMAGE FORMING SYSTEM, IMAGE FORMING APPARATUS, IMAGE FORMING METHOD, AND NON-TRANSITORY STORAGE MEDIUM

BACKGROUND

Field of the Disclosure

The present disclosure relates to an image forming system, an image forming apparatus, an image forming method, and a non-volatile storage medium.

Description of the Related Art

As a technique for performing printing not via a printer driver (what is called direct print), Japanese Patent Application Laid-Open No. 2010-130502 discusses a technique for performing the direct print on a Portable Document Format (PDF) file. In the technique discussed in Japanese Patent Application Laid-Open No. 2010-130502, if a PDF file received from an external apparatus via a network is encrypted, an image forming apparatus prompts a user to input an authority password. Then, using the authority password input by the user, the image forming apparatus changes a security attribute regarding the PDF file to printing permitted.

In the technique discussed in Japanese Patent Application Laid-Open No. 2010-130502, however, the image forming apparatus controls whether to permit printing in units of PDF files received from the external apparatus. Thus, in the technique discussed in Japanese Patent Application Laid-Open No. 2010-130502, a printing result intended by the user may not be obtained.

SUMMARY

According to an aspect of the present disclosure, an image forming system includes an acquisition unit configured to acquire a printing target file that can be partially encrypted, a notification unit configured to give a notification in a case where an encrypted portion of the printing target file cannot be opened, and a printing unit configured to print an image based on the printing target file not under control of a printer driver.

Further features of the present disclosure will become apparent from the following description of exemplary embodiments with reference to the attached drawings.

BRIEF DESCRIPTION OF THE DRAWINGS

FIGS. 11A, 11B, and 11C are diagrams illustrating modifications of the GUI displayed on the image forming apparatus.

DESCRIPTION OF THE EMBODIMENTS

Exemplary embodiments will be described below with reference to the drawings.

First, a first exemplary embodiment is described.

Figure 1:
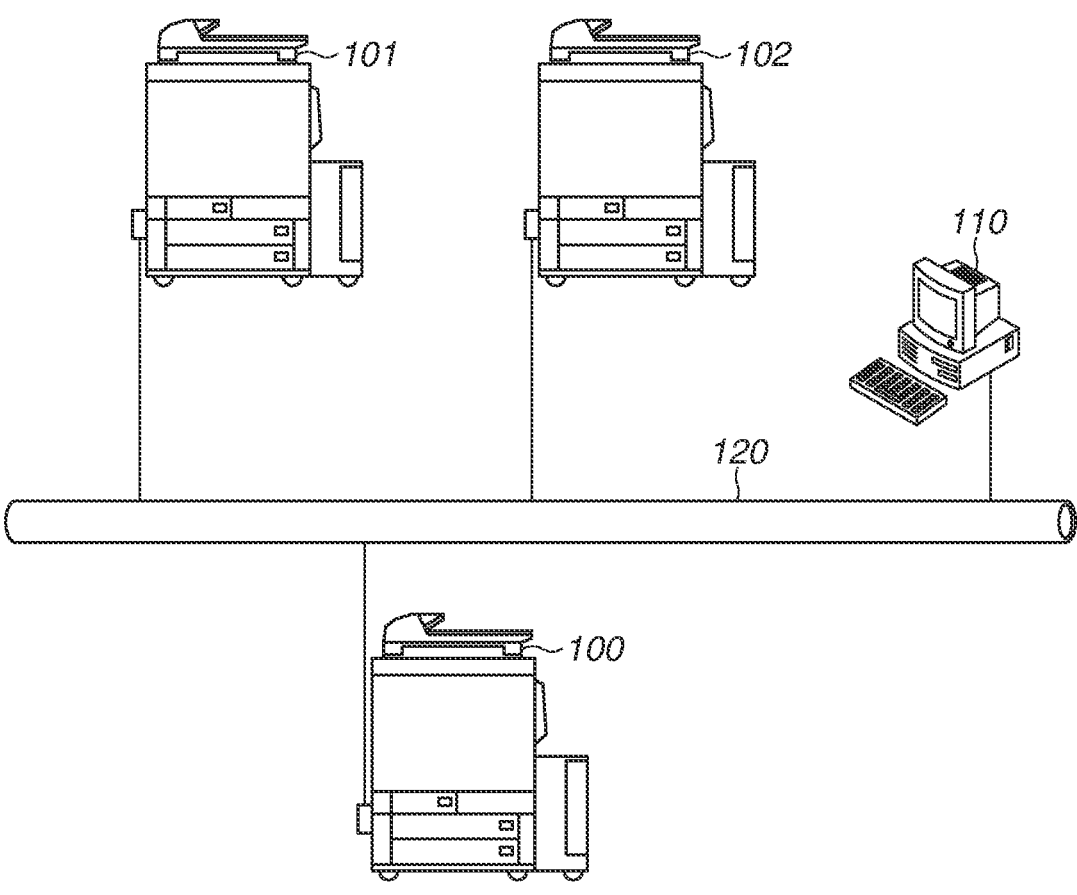
FIG. 1 is a diagram illustrating a configuration of an image forming system.

FIG. 1 is a diagram illustrating an example of a configuration of an image forming system. In FIG. 1, image forming apparatuses 100 to 102 are connected to a network 120. The image forming apparatuses 100 to 102 can communicate with external apparatuses including a personal computer (PC) 110 via the network 120. FIG. 1 illustrates a case where the image forming apparatuses 100 to 102 perform wired communication with the external apparatuses. The image forming apparatuses 100 to 102, however, may wirelessly communicate with the external apparatuses. The PC 110 transmits print data to the image forming apparatuses 100 to 102 via the network 120.

The image forming apparatuses 100 to 102 each receive the print data and execute a printing process based on the received print data. The image forming apparatuses 100 to 102 may have the same configuration or different configurations. In the present exemplary embodiment, for ease of description, a case is described where the image forming apparatuses 100 to 102 have the same configuration. Accordingly, hereinafter, the image forming apparatuses 100 to 102 will be described by use of the image forming apparatus 100 as an example.

Figure 2:
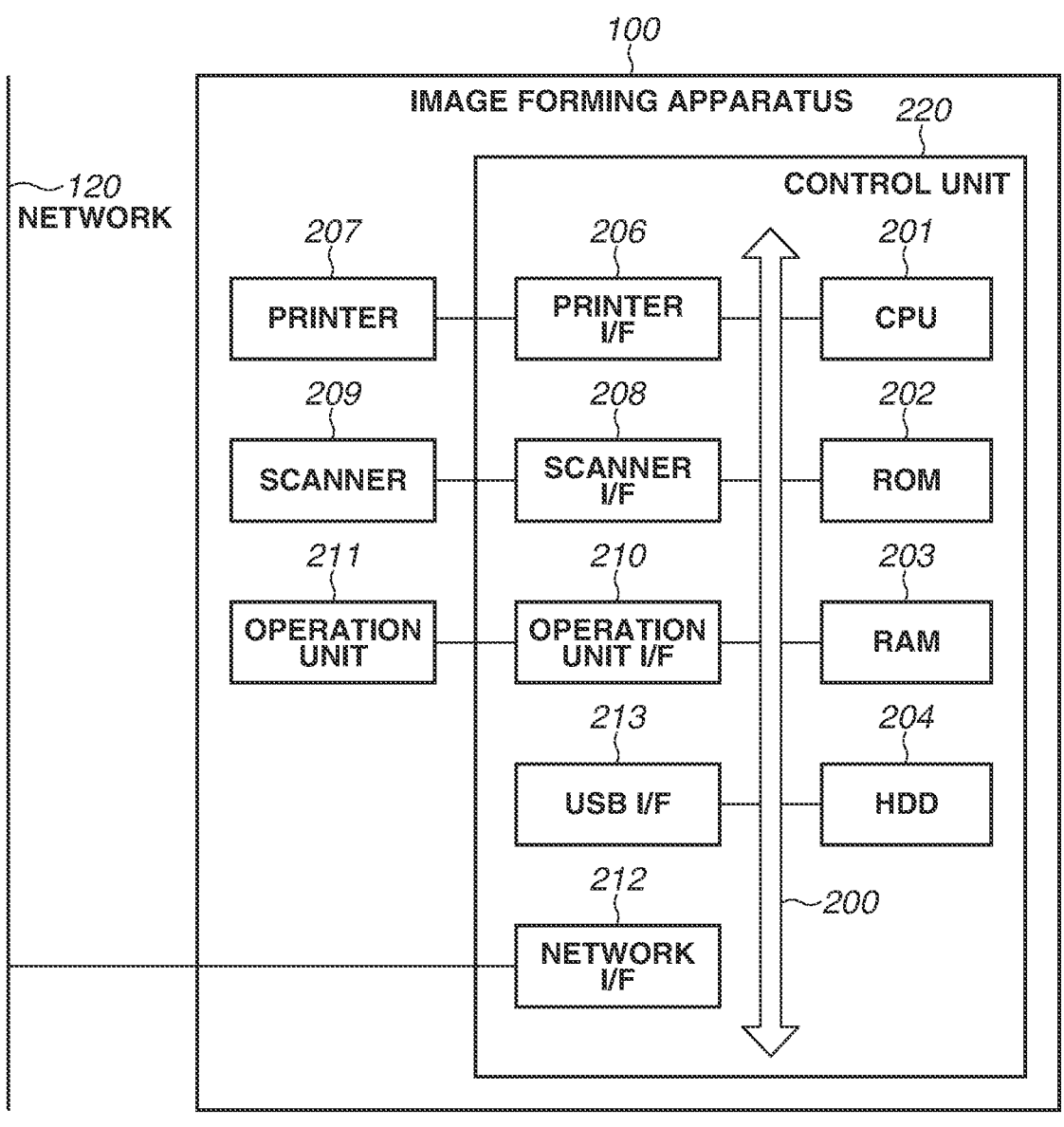
FIG. 2 is a diagram illustrating a configuration of an image forming apparatus.

FIG. 2 is a diagram illustrating an example of the configuration of the image forming apparatus 100. In the present exemplary embodiment, a case is illustrated where the image forming apparatus 100 is a multifunction peripheral. The image forming apparatus 100, however, is not limited to a multifunction peripheral. For example, the image forming apparatus 100 may be a printer that does not have a scanner function.

In FIG. 2, a central processing unit (CPU) 201 reads control programs stored in a read-only memory (ROM) 202 and executes various processes for controlling the operation of the image forming apparatus 100. The CPU 201 is connected to other units by a bus 200.

The ROM 202, a random-access memory (RAM) 203, and a hard disk drive (HDD) 204 are connected to the bus 200.

The ROM 202 stores the control programs. The RAM 203 is used as a main memory for the CPU 201 and also used as a temporary storage area such as a work area. The HDD 204 stores print data and various pieces of data such as that on a scanned image.

In a case where the image forming apparatus 100 has the configuration illustrated in FIG. 2, a single CPU 201 executes processes illustrated in flowcharts described below. A mode for executing the processes illustrated in the flowcharts described below, however, may be another mode. For example, a plurality of CPUs may cooperate to execute the processes illustrated in the flowcharts described below. The image forming apparatus 100 may include a processor other than the CPU. For example, the image forming apparatus 100 may include a graphics processing unit (GPU) instead of or in addition to the CPU.

A printer interface (I/F) 206 connects a printer 207 and the bus 200. The printer 207 executes a printing process based on print data received from an external apparatus or a scanned image generated by a scanner 209.

A scanner I/F 208 connects the scanner 209 and the bus 200. The scanner 209 reads a document and generates a scanned image. The scanned image generated by the scanner 209 is printed by the printer 207 or stored in the HDD 204.

An operation unit I/F 210 connects an operation unit 211 and the bus 200. For example, the operation unit 211 includes a display unit having a touch panel function (e.g., a liquid crystal display unit) and a keyboard. The operation unit I/F 210 displays various operation screens. A user inputs an instruction or information to the image forming apparatus 100 via the operation unit 211. The operation unit 211 receives the instruction or the information input by the user.

A network I/F 212 connects to the network 120 and communicates with an external apparatus connected to the network 120. The network I/F 212 receives print data transmitted from the external apparatus. The printer 207 executes a printing process based on the print data received by the network I/F 212.

A Universal Serial Bus (USB) I/F 213 connects a storage device used by connecting to a USB port and the bus 200. In the following description, the storage device used by connecting to the USB port will be referred to as a USB memory. If the user connects the USB memory to the USB I/F 213, the image forming apparatus 100 recognizes data stored in the USB memory. The user selects data in the USB memory via the operation unit 211 and instructs the image forming apparatus 100 to print the selected data. The printer 207 executes a printing process based on the print data.

The bus 200, the CPU 201, the ROM 202, the RAM 203, the HDD 204, the printer I/F 206, the scanner I/F 208, the operation unit I/F 210, and the network I/F 212 are collectively referred to as a control unit 220.

Figure 3:
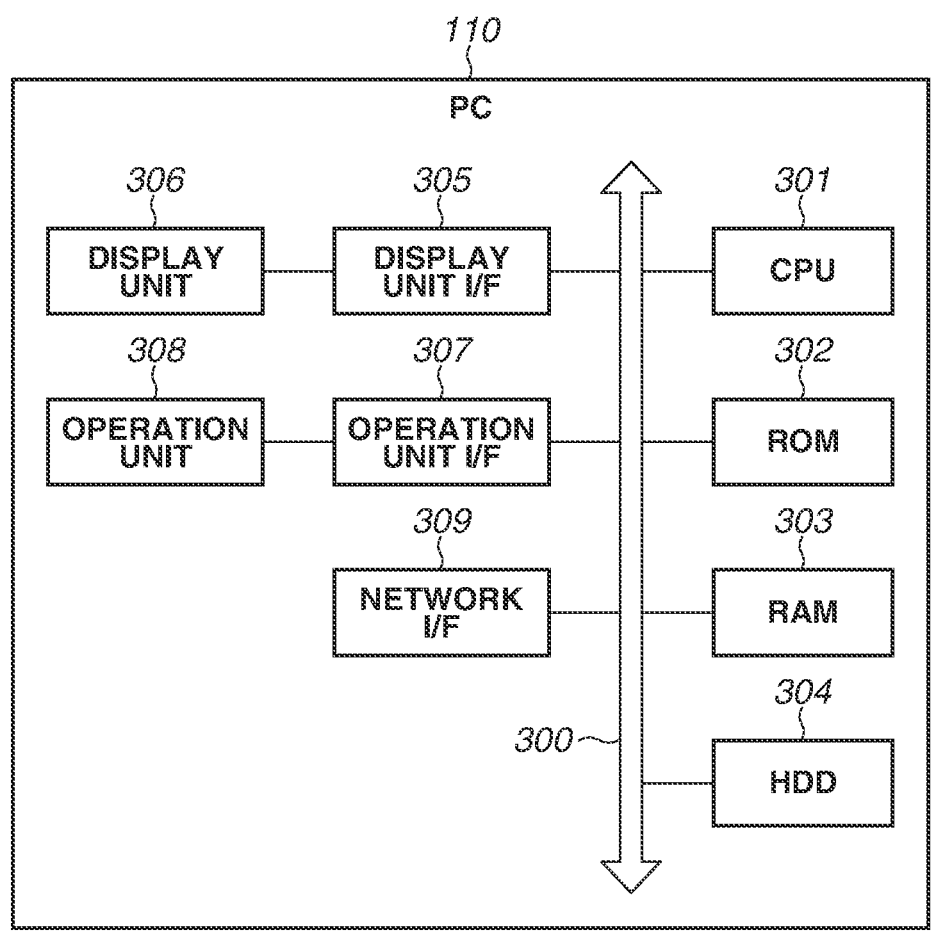
FIG. 3 is a diagram illustrating a configuration of a personal computer (PC).

FIG. 3 is a diagram illustrating an example of the configuration of the PC 110.

The PC 110 includes a CPU 301, a ROM 302, and a RAM 303.

The CPU 301, the ROM 302, and the RAM 303 are connected to a bus 300. The CPU 301 reads a program for the PC 110 stored in the ROM 302. Then, the CPU 301 executes the program for the PC 110 using the RAM 303 that functions as a main memory and a primary storage area for data. Similarly to the image forming apparatus 100, a plurality of CPUs may cooperate to execute the processes illustrated in the flowcharts described below. The PC 110 may include a processor other than the CPU.

The PC 110 also includes an HDD 304 that functions as a storage area for data.

A display unit I/F 305 connects a display unit 306 and the bus 300. For example, the display unit 306 is a liquid crystal display unit.

An operation unit I/F 307 connects an operation unit 308 and the bus 300. For example, the operation unit 308 includes a keyboard and a mouse. The user inputs an instruction or information to the PC 110 via the operation unit 308. The operation unit 308 receives the instruction or the information input by the user. The configuration of the operation unit 308 is not limited to the configuration thereof including the keyboard and the mouse. At least the display unit 306 and a part of the operation unit 308 may be integrated together (a single device).

A network I/F 309 connects to the network 120 and communicates with external apparatuses including the image forming apparatus 100 connected to the network 120.

A case is described by an example here where, in the image forming system according to the present exemplary embodiment, a printing target file includes a Portable Document Format (PDF) file. As one of PDF functions, there is a function of combining a plurality of files into a single PDF unit. In the following description, the files combined into a single PDF unit will be referred to as a PDF portfolio, where necessary. A PDF portfolio can incorporate various file types created by different applications.

As a function of PDF version 2.0 (hereinafter referred to as PDF 2.0), there is a function termed "unencrypted wrapper document". The function allows an unencrypted PDF file and an encrypted PDF file to coexist in a single PDF portfolio. The function can also set a password for opening a PDF file only to a particular PDF file in the PDF portfolio. Thus, for example, it is possible to create a PDF portfolio the cover of which can be unconditionally opened, but the content of which needs to be opened using a password.

When a PDF file is subjected to direct print, the PDF file is transmitted to an image forming apparatus without being opened. Thus, in a case where a PDF file is subjected to the direct print, there can be a case where the PDF file is transmitted to the image forming apparatus in a state where a password is not input, unlike in a case where a PDF file transmitted to the image forming apparatus is printed via a printer driver.

However, when a PDF portfolio including an encrypted PDF file is subjected to the direct print and in a case where a password for the PDF file is not input, the image forming apparatus cannot print the PDF file. This reduces convenience of users. Accordingly, in the following exemplary embodiments, the processing by an image forming system capable of improving the convenience of users when a PDF portfolio is subjected to the direct print and in a case where a password for a PDF file in the PDF portfolio is not input is illustrated.

Figure 4:
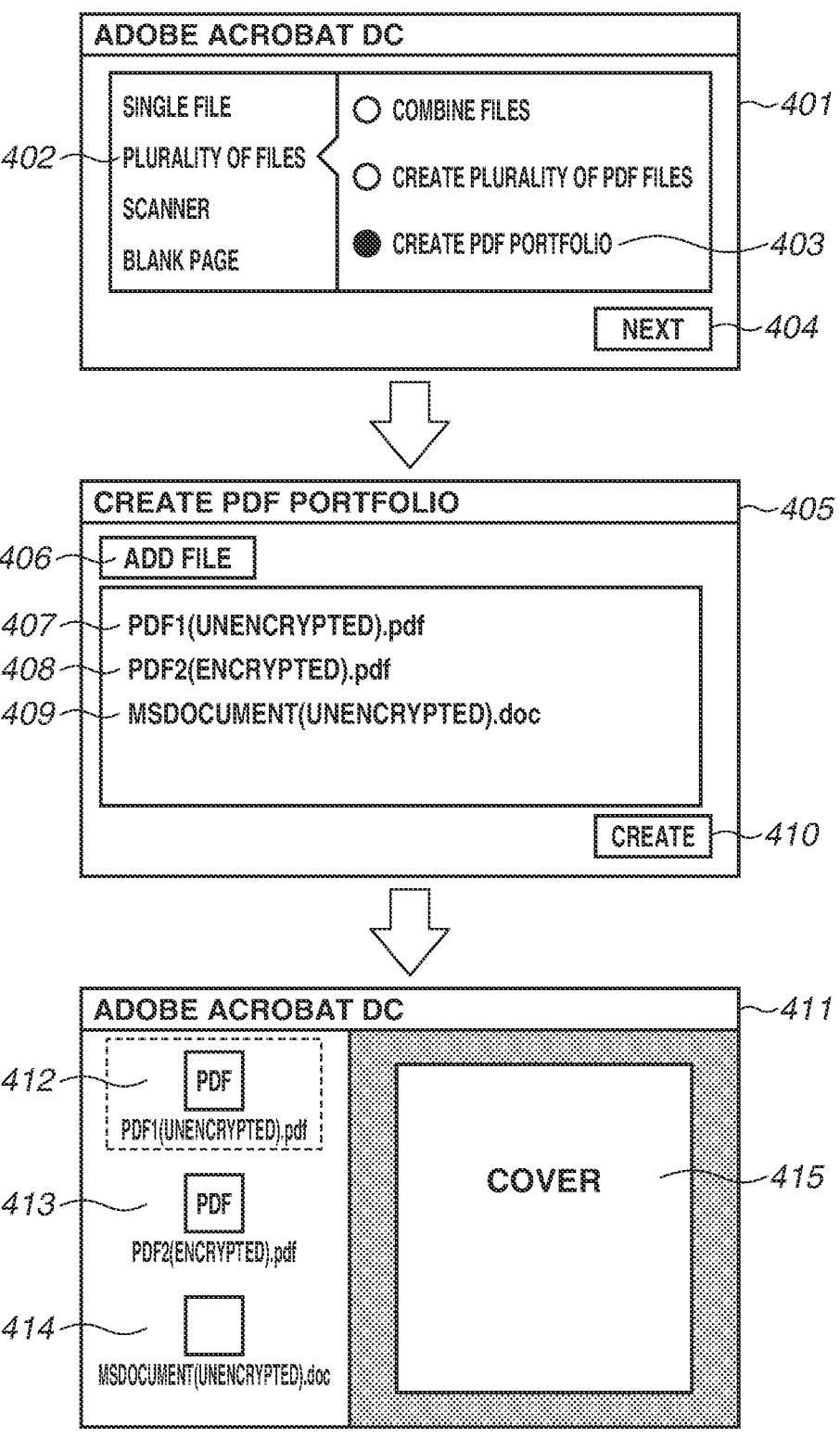
FIG. 4 is a diagram illustrating a method for creating a Portable Document Format (PDF) portfolio.

First, with reference to FIG. 4, a description is given of an example of a method for creating a PDF portfolio.

The specifications of a PDF and a PDF portfolio are publicly available. Thus, a user can create a PDF portfolio by creating a program based on these specifications. It is, however, also possible to create a PDF portfolio using Adobe Acrobat DC by Adobe (hereinafter, Adobe Acrobat DC will be referred to as Acrobat DC). In the present exemplary embodiment, a case is illustrated where a PDF portfolio is created using Acrobat DC.

FIG. 4 is a diagram illustrating an example of transition of a graphical user interface (GUI) when a PDF portfolio is created using Acrobat DC. As illustrated at the top of FIG. 4, the user newly launches Acrobat DC 401 and selects "plurality of files" from a menu 402. As a result, a "create PDF portfolio" menu 403 is displayed. The user presses a "next" button 404 in a state where the menu 403 is selected. As a result, as illustrated in the middle of FIG. 4, a "create PDF portfolio" dialog 405 is displayed.

The user presses an "add file" button 406 in the dialog 405. As a result, a screen for selecting files to be included in a PDF portfolio is displayed. The user selects the files to be added to a PDF portfolio by operating the screen. The files selected at this time are prepared in advance. The dialog in the middle of FIG. 4 illustrates an example of a screen displayed after three files are added. The three files are a file 407 having a file name "PDF1(unencrypted).pdf", a file 408 having a file name "PDF2(encrypted).pdf", and a file 409 having a file name "MSdocument(unencrypted).doc".

In the example illustrated in the middle of FIG. 4, the file 407 is an unencrypted PDF file. On the other hand, the file 408 is an encrypted PDF file. As described above, with PDF 2.0, an unencrypted PDF file and an encrypted PDF file can coexist in a PDF portfolio.

The file 409 is an example of a file other than a PDF file. As described above, it is also possible to add a file other than a PDF file to the PDF portfolio.

The user selects all files to be included in the PDF portfolio and then presses a "create" button 410. As a result, the PDF portfolio is created.

A screen 411 illustrated at the bottom of FIG. 4 is an example of a screen displayed when the PDF portfolio created as described above is opened using Acrobat DC. A view on the left side of the screen 411 displays display information 412 to 414 for displaying the files 407 to 409 included in the PDF portfolio. FIG. 4 illustrates a case where icons representing the files 407 to 409 are included in the display information 412 to 414.

On the screen 411, a state where the file 407 having the file name "PDF1(unencrypted).pdf" is selected by the user is indicated by a dashed line surrounding the display information 412. Since the file 407 is unencrypted, if the user selects the file 407 (the display information 412), a preview of data included in the file 407 is displayed on a preview screen 415 in the screen 411. "Cover" displayed in the preview screen 415 indicates that the file 407 includes data on a cover.

If, on the other hand, the user selects the encrypted file 408 (the display information 413), a dialog for inputting a password is displayed. If a correct password is input to the dialog, a preview of information included in the file 408 is displayed on the preview screen 415.

The example of the method for creating a PDF portfolio has been described above.

Figure 5A:
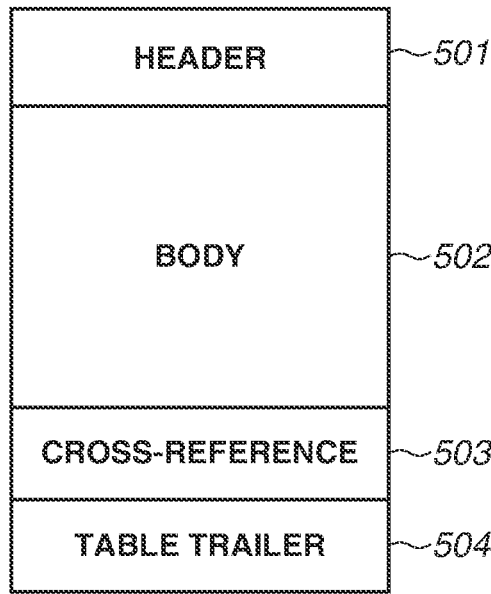
FIGS. 5A and 5B are diagrams illustrating a data structure of a PDF.
Figure 5B:
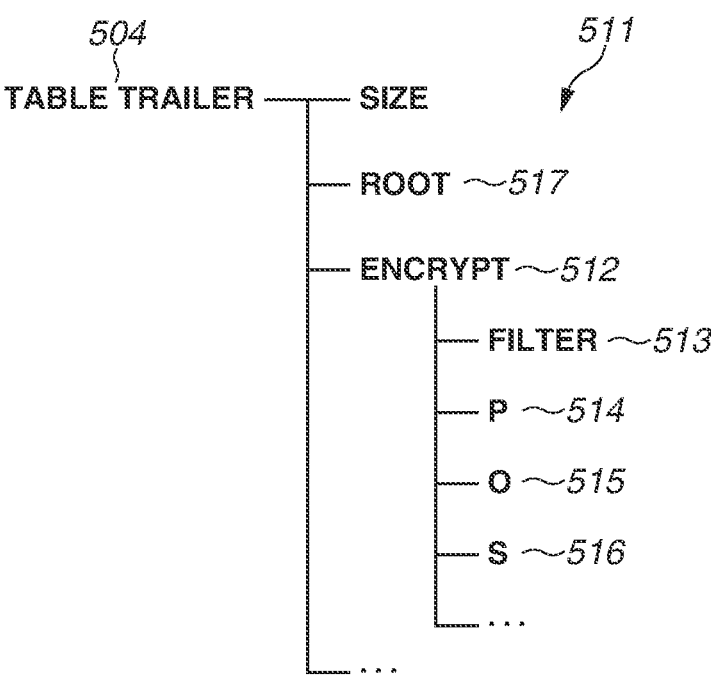
Figure 6:
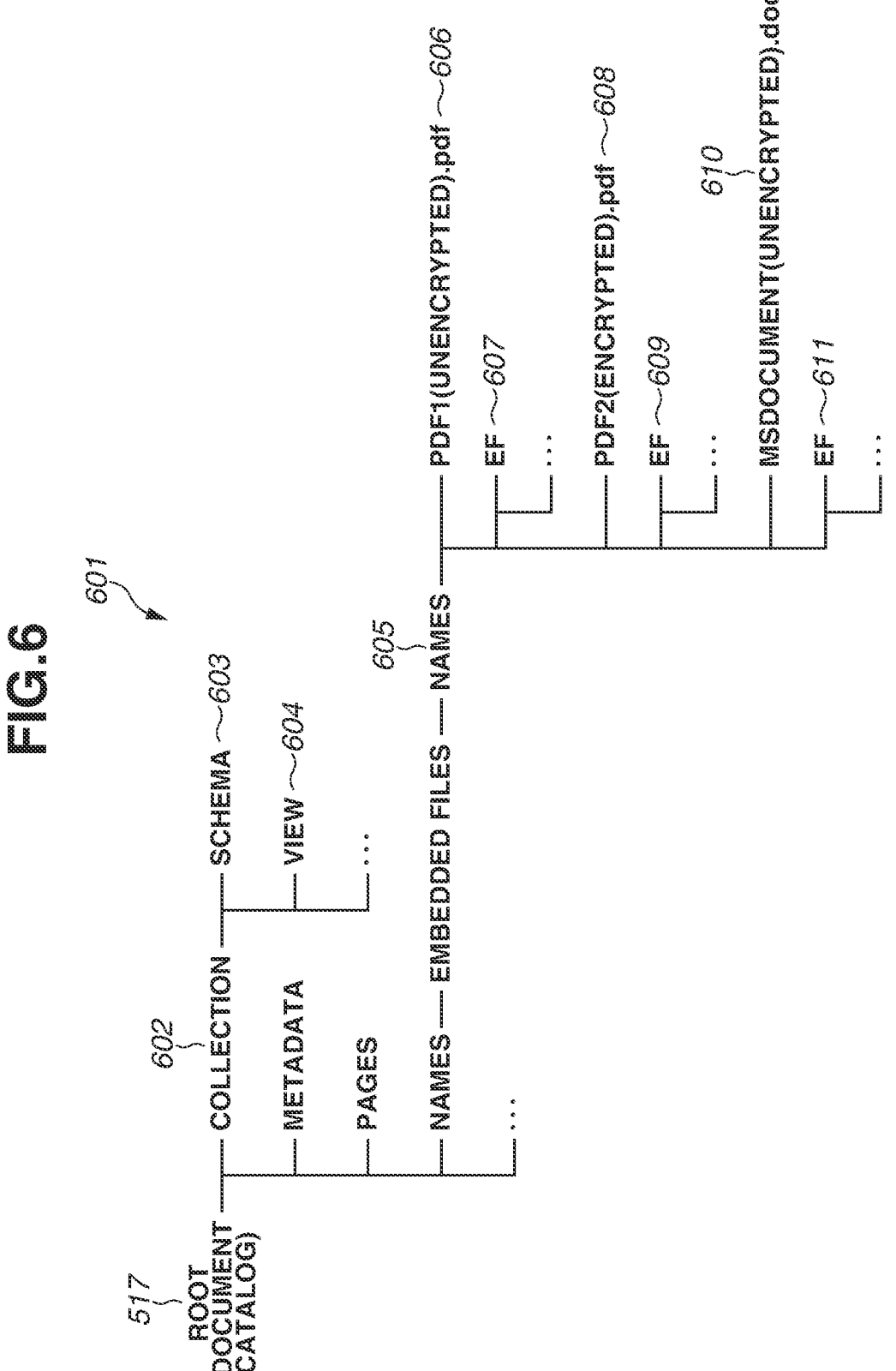
FIG. 6 is a diagram illustrating a structure of a part of the PDF portfolio.

Next, with reference to FIGS. 5A, 5B, and 6, examples of structures of a normal PDF file and a PDF portfolio are described. The normal PDF file is a single PDF file that is not a PDF portfolio. In the following description, the normal PDF file and the PDF portfolio will be collectively referred to as a PDF, where necessary.

FIGS. 5A and 5B are diagrams illustrating an example of the data structure of a PDF. The PDF includes four components, namely a header 501, a body 502, a cross-reference 503, and a table trailer 504. Both the normal PDF file and the PDF portfolio have the data structure including these four components.

In FIG. 5A, the header 501 is an area where version information regarding the PDF is described. The body 502 is an area where the content of a document is described. In the body 502 of the PDF portfolio, information regarding a plurality of files is embedded. The cross-reference 503 is an area where an offset value for randomly accessing an object is described. The table trailer 504 is an area where information for accessing the cross-reference 503 and a special object is described.

FIG. 5B is a diagram illustrating some key items included in the table trailer 504 in a tree format. A tree 511 indicates the key items in the table trailer 504 in the tree format. In the specifications of the PDF, key items that are not illustrated in FIG. 5B also exist. FIG. 5B, however, does not illustrate such key items for ease of description.

A key item (Encrypt) 512 includes information regarding encryption. For example, an encrypted PDF file such as the file 408 having the file name "PDF2(encrypted).pdf" has information regarding encryption in the key item (encrypt) 512. More specifically, by checking the key item (encrypt) 512, the CPU 201 can determine whether the PDF is encrypted.

Next, examples of key items included in the key item (encrypt) 512 are described.

In a key item (filter) 513, an encryption format of the PDF is specified. For example, if "/Standard" is specified in the key item (filter) 513, it indicates that the PDF is a PDF in a password format.

In a key item (P) 514, a series of flags for specifying operations permitted to be performed on the encrypted PDF file is set. For example, whether to permit the operations such as editing, copying, and printing is specified in the key item (P) 514 using the flags. By checking the key item (P) 514, the CPU 201 can determine whether printing is permitted. This will be described below.

In a key item (O) 515, information regarding an owner password is specified. In a key item (S) 516, information regarding a user password is specified. The user password is mainly a password required to open the PDF. The owner password is mainly a password required to perform an operation that is not permitted in the key item (P) 514. In the present exemplary embodiment, if it is specified in the key item (P) 514 of the encrypted PDF file that printing is not permitted, it is determined whether a password specified by the user when printing is performed matches the owner password specified in the key item (O) 515.

A key item (root) 517 indicates a reference destination of "document catalog". "Document catalog" is a root at the top of an object hierarchy of the PDF. "Document catalog" includes information such as a document content.

In the PDF portfolio, "document catalog" also includes information regarding the files embedded in the PDF portfolio. This is described in detail with reference to FIG. 6.

FIG. 6 is a diagram illustrating an example of the structure of a part of the PDF portfolio in a tree format.

A tree 601 indicates key items in "document catalog" of the PDF portfolio in a tree format. In the specifications of the PDF, key items that are not illustrated in FIG. 6 also exist. FIG. 6, however, does not illustrate such key items for ease of description.

To "document catalog" of the PDF portfolio, a key item (collection) 602 is added. In the key item (collection) 602, information regarding display and organization is mainly described as information regarding the PDF portfolio.

In a key item (schema) 603, for example, fields of the PDF portfolio are defined. The fields as used herein refer to items representing attributes of a file, such as the file name, the creation date, and the update date. In a case where the key item (schema) 603 is not present, standard fields are used. By use of the key item (schema) 603, an individual field can be specified.

In a key item (view) 604, the manner of displaying each embedded file when the PDF portfolio is opened using a viewer such as Acrobat DC is specified. For example, the manner of displaying each of the files 407 to 409 illustrated in FIG. 4 (a display mode of the display information 412 to 414) is specified in the key item (view) 604. As described above, the dialog at the bottom of FIG. 4 illustrates a case where icons are included in the display information 412 to 414 regarding the respective files 407 to 409. By specification of the key item (view) 604, for example, it is possible to display information regarding each file included in the PDF portfolio in detail or hide the information regarding each file.

By checking of the key item (collection) 602 including the key items 603 and 604, whether the PDF is a PDF portfolio is determined.

In the key item (collection) 602, a key item other than the key items 603 and 604 exists, but is not described in detail herein.

In "Root"-"Names"-"Embedded Files"-"Names" (a key item (Names) 605), information regarding the plurality of files embedded in the PDF portfolio and main bodies thereof are described.

The key item (Names) 605 is an array. The number of items in the array is changed depending on the number of files embedded in the PDF portfolio. For example, in the PDF portfolio created as illustrated in FIG. 4, information regarding the files is described in key items 606 to 611 illustrated in FIG. 6.

For example, in the key items 606 and 607, information regarding the file 407 (the file name: "PDF1(unencrypted) .pdf"), which is one of the files embedded in the PDF portfolio, is described. In the key item 606, the file name ("PDF1(unencrypted).pdf") is described. In the key item 607, various pieces of information regarding the file 407 and the main body of the file 407 are stored. In the key items 608, 609, 610, and 611, information regarding the files 408 (the file name: "PDF2(encrypted).pdf") and 409 (the file name: "MSdocument(unencrypted).doc") embedded in the PDF portfolio is described.

As described above, by checking of the information in the key item (names) 605, the contents of the files embedded in the PDF portfolio are identified.

Examples of the structures of a PDF and a PDF portfolio have been described above.

Next, a description is given of an example of processing when the image forming system according to the present exemplary embodiment performs the direct print. In flowcharts in FIGS. 7 and 9, a case is illustrated where a file that is a target of the direct print is a PDF. In addition, a case is illustrated where the PDF that is the target of the direct print includes a normal PDF file and a PDF portfolio including a plurality of files. The file that is the target of the direct print, however, may include a file in a file format other than the PDF format. In a case where the direct print is performed, control by the printer driver is not performed. As described above, the normal PDF file is a single PDF file that is not a PDF portfolio.

The normal PDF file and the PDF portfolio are collectively referred to as a PDF, where necessary.

First, a description is given of an example of the processing until the PC 110 transmits a PDF to the image forming apparatus 100.

Figure 7:
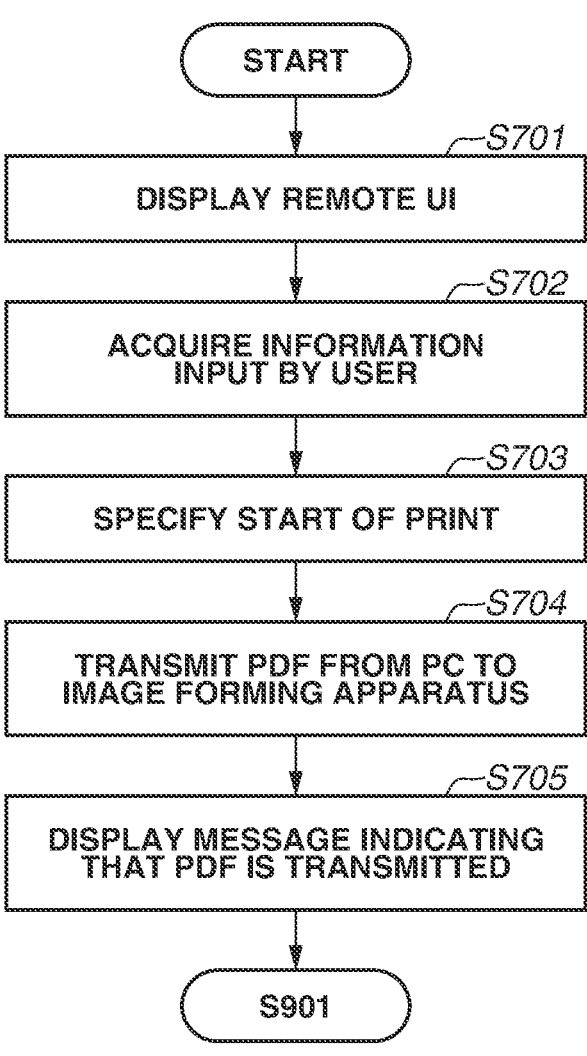
FIG. 7 is a flowchart illustrating a first example of processing performed by the PC.
Figures 8A, 8B, 8C:
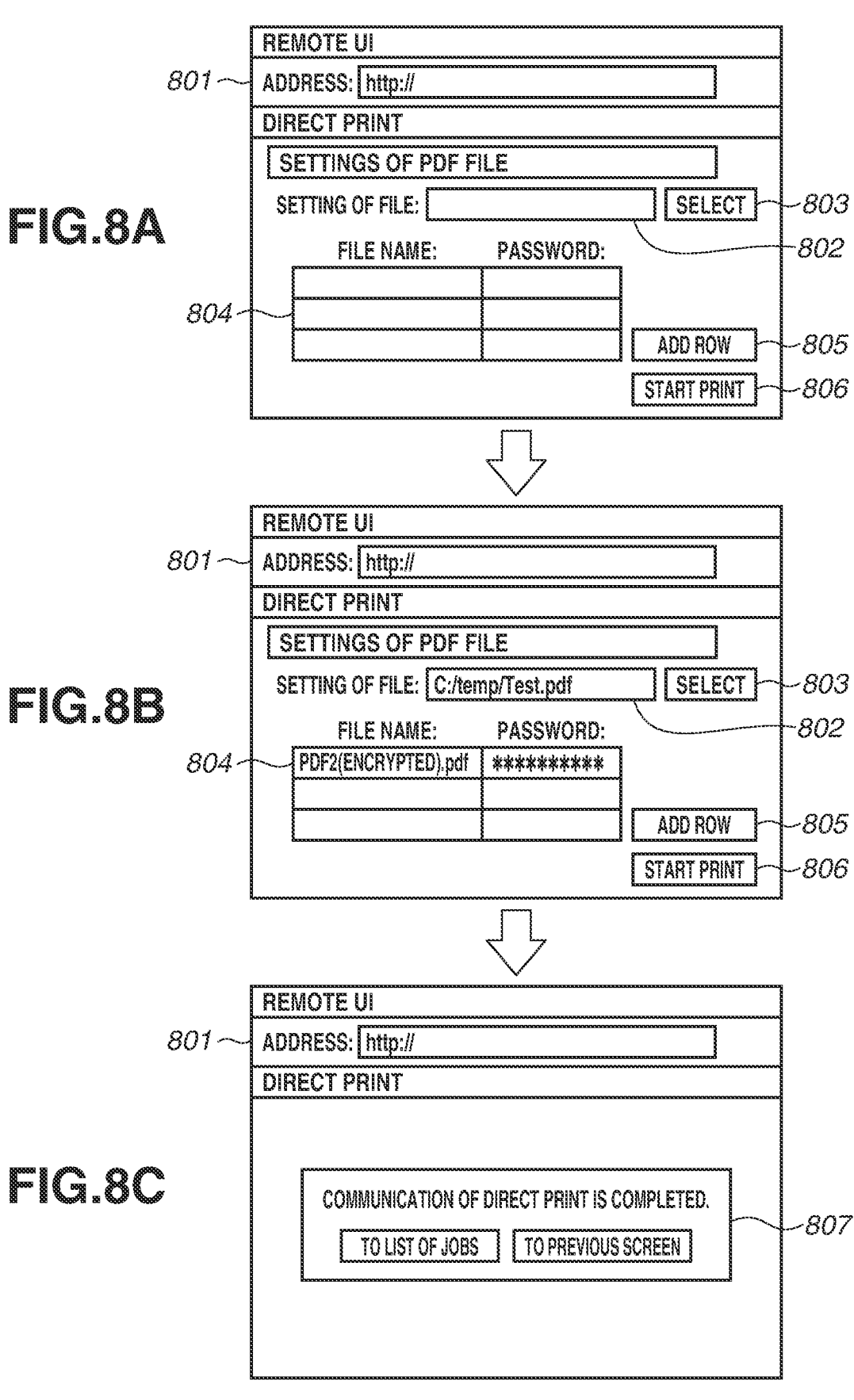
FIGS. 8A, 8B, and 8C are diagrams illustrating a graphical user interface (GUI) for giving an instruction to perform direct print.

FIG. 7 is a flowchart illustrating an example of the processing performed by the PC 110. FIG. 7 illustrates the processing until the PC 110 transmits a PDF to the image forming apparatus 100. FIGS. 8A to 8C are diagrams illustrating an example of transition of a GUI for the user to give an instruction to perform the direct print. The GUI illustrated in FIGS. 8A to 8C is what is called a remote user interface (UI). The remote UI is a UI operated by the user using an information processing apparatus (the PC 110 in the present exemplary embodiment) other than the image forming apparatus 100 that performs the direct print.

First, in step S701, the CPU 301 displays a screen of the remote UI on the display unit 306 according to specification by the user. For example, the screen of the remote UI is opened on a general web browser installed on the PC 110.

Next, in step S702, the CPU 301 acquires information input by the user via the operation unit 308 and displays the information on the screen of the remote UI. The information acquired by the CPU 301 in step S702 includes information required to perform the direct print of a PDF. For example, the CPU 301 displays a file path of the PDF on the screen of the remote UI. The CPU 301 also displays the file name of an encrypted file among files included in a PDF portfolio and a password corresponding to the encrypted PDF file on the screen of the remote UI, where necessary.

Next, in step S703, the CPU 301 specifies the start of print according to an instruction from the user via the operation unit 308.

With reference to FIGS. 8A to 8C, an example of the transition of the remote UI in steps S701 to S703 is described.

First, in step S701, as illustrated in FIG. 8A, a remote UI screen 801 in an initial state is displayed. Then, in step S702, as illustrated in FIG. 8B, the user specifies a PDF (a normal PDF file or a PDF portfolio) to be subjected to the direct print in a "setting of file" field 802 in the remote UI screen 801 by operating the operation unit 308. The user can also specify a normal PDF file in the "setting of file" field 802.

When specifying the PDF to be subjected to the direct print in the "setting of file" field 802, the user presses a file selection button 803. As a result, a file selection dialog (not illustrated) is displayed on the remote UI screen 801. The file selection dialog displays information regarding files. The user specifies a file to be subjected to the direct print from the information regarding the files displayed in the file selection dialog. Instead of thus specifying the file to be subjected to the direct print, the user may directly input the file path of the file to be subjected to the direct print in the "setting of file" field 802. FIG. 8B illustrates an example of a state where the "setting of file" field 802 displays "C:/ temp/Test.pdf" as the file path.

If the file specified in the "setting of file" field 802 is a PDF portfolio, then in step S702, the user inputs information to a password entry field 804 by operating the operation unit 308. The information to be input to the password entry field 804 includes a password corresponding to an encrypted PDF file in the PDF portfolio and the file name of the PDF file. The user manually inputs the file name and the password to the password entry field 804 by operating the operation unit 308. FIG. 8B illustrates a state where the file name (PDF2 (encrypted).pdf) of the file 408 embedded in the PDF portfolio and a password corresponding to the file 408 are input to the password entry field 804.

Alternatively, the user may omit the input of the file name to the password entry field 804 and input only the password to the password entry field 804. In this case, the processing is performed on an assumption that the password input to the password entry field 804 is specified for all encrypted PDF files in the PDF portfolio.

Alternatively, the CPU 301 may detect all encrypted PDF files in the PDF portfolio and automatically display the file names of the detected PDF files in the password entry field 804. A specific example of this method will be described separately in a second exemplary embodiment.

There can also be a case where a plurality of encrypted PDF files coexist in the PDF portfolio. Thus, as in the password entry field 804, a password is allowed to be input for each of the plurality of encrypted files. If the user presses an addition button 805, a row is added to the password entry field 804.

If the file set in the "setting of file" field 802 is a normal PDF file, a password for the normal PDF file may be input to the password entry field 804. Alternatively, a password entry field other than the password entry field 804 may be displayed as a password entry field for the normal PDF file. In this case, the password for the normal PDF file is input to the password entry field for the normal PDF file.

Next, in step S703, the user presses a print button 806 by operating the operation unit 308.

The description returns to the flowchart in FIG. 7. In step S704, the CPU 301 transmits the PDF to the image forming apparatus 100 via the network I/F 309. If a password is input to the password entry field 804, information regarding the password is also transmitted to the image forming apparatus 100 in addition to the PDF. In the present exemplary embodiment, the information regarding the password input to the password entry field 804 is transmitted to the image forming apparatus 100 regardless of whether a correct password is input to the password entry field 804. In the present exemplary embodiment, there is a case where the start of the print of a PDF portfolio in which an encrypted PDF file is embedded is specified in a state where a password is not input to the password entry field 804. In this case, in the present exemplary embodiment, the PDF (the PDF portfolio) is transmitted, but the information regarding the password is not transmitted.

Next, in step S705, the CPU 301 displays, on the remote UI screen 801, a message indicating that the PDF is transmitted to the image forming apparatus 100. FIG. 8C illustrates a case where the message is displayed in a dialog box 807.

The example of the processing until the PC 110 transmits a PDF to the image forming apparatus 100 has been described above.

Next, an example of the processing performed by the image forming apparatus 100 is described.

Figure 9:
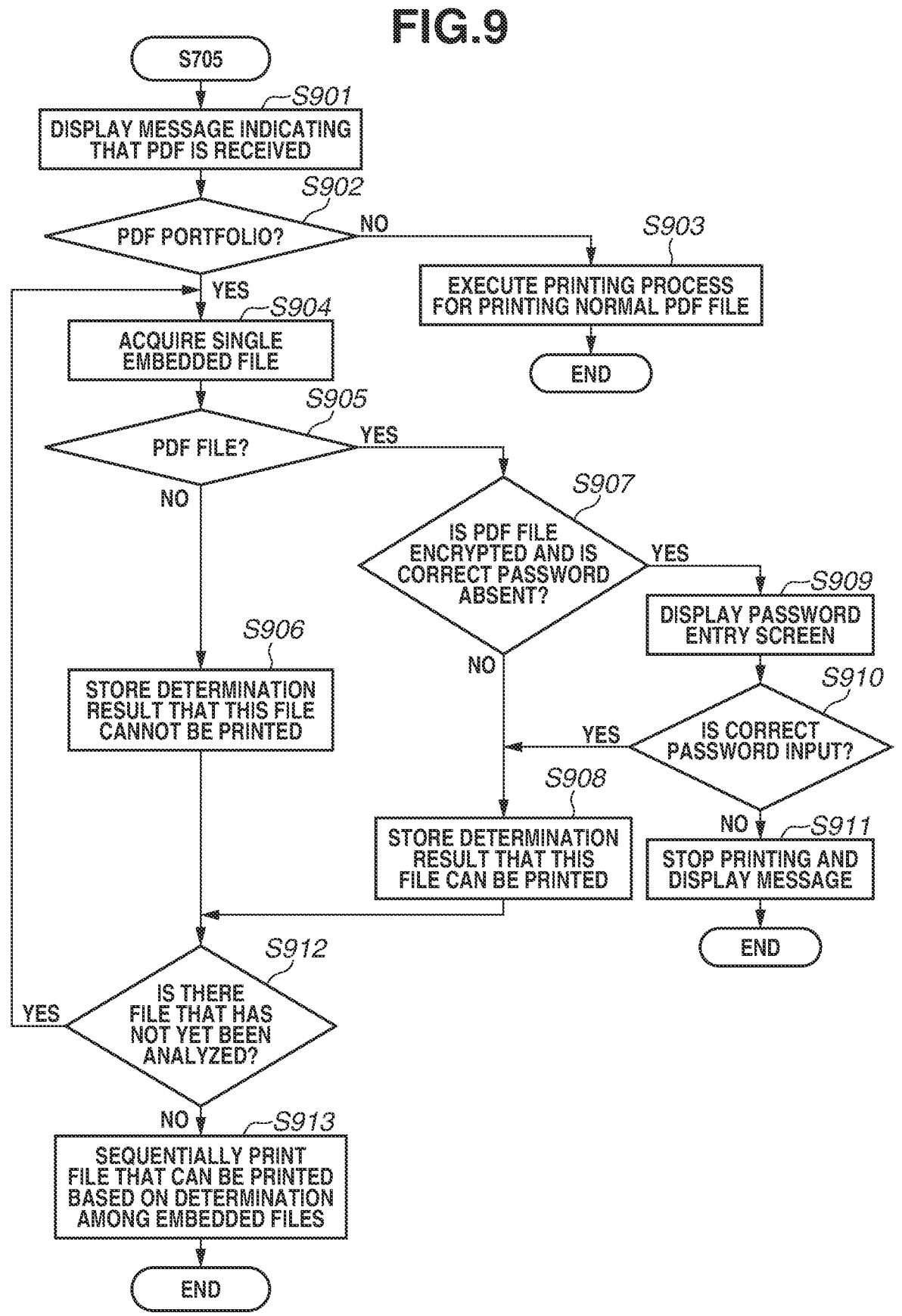
FIG. 9 is a flowchart illustrating a first example of processing performed by the image forming apparatus.
Figure 10:
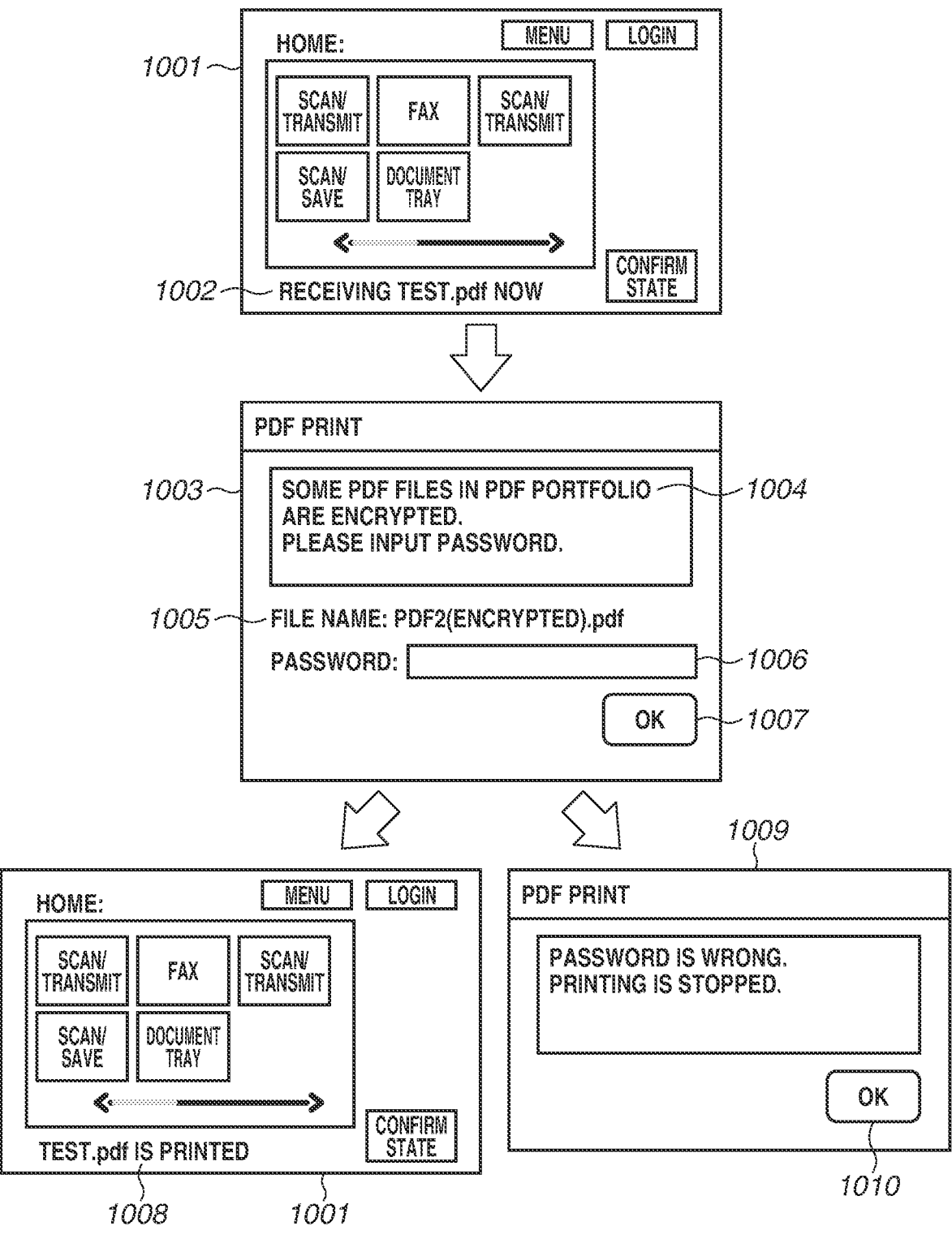
FIG. 10 is a diagram illustrating a GUI displayed on the image forming apparatus.

FIG. 9 is a flowchart illustrating an example of the processing performed by the image forming apparatus 100. FIG. 10 is a diagram illustrating an example of the transition of a GUI (a screen) displayed on the image forming apparatus 100.

First, in step S901, the CPU 201 displays, on the display unit included in the operation unit 211, a message indicating that a PDF is received from the PC 110. In the following descriptions, the display unit included in the operation unit 211 will be referred to as the operation unit 211 where necessary. At the top of FIG. 10, an example of a home screen 1001 displayed on the operation unit 211 in step S901 is illustrated. FIG. 10 illustrates a state where a message 1002 indicating "receiving Test.pdf now" is displayed on the home screen 1001.

Next, in step S902, the CPU 201 analyzes the PDF transmitted from the PC 110 and determines whether the PDF is a PDF portfolio.

With reference to FIGS. 5A, 5B, and 6, a specific example of the determination method in step S902 is described. If the image forming apparatus 100 receives a PDF via the network I/F 212, the CPU 201 analyzes the PDF and searches for the table trailer 504. Next, the CPU 201 accesses the key item (root) 517 in the table trailer 504 and searches for the reference destination of "document catalog". Next, the CPU 201 searches through "document catalog" for a "root"- "collection" key (see the key item (collection) 602). If the "root"-"collection" key is present, the CPU 201 determines that the PDF transmitted from the PC 110 is a PDF portfolio. If not, the CPU 201 determines that the PDF transmitted from the PC 110 is a normal PDF file.

As a result of the determination in step S902, if the PDF transmitted from the PC 110 is not a PDF portfolio, i.e., if the PDF is a normal PDF file (NO in step S902), the processing proceeds to step S903. In step S903, the CPU 201 executes a printing process for printing the normal PDF file. The CPU 201 determines whether the normal PDF file is an encrypted PDF file, and also determines whether a password is specified. Even if the normal PDF file is an encrypted PDF file, if the encryption of the PDF file is decrypted with a received password, the normal PDF file can be printed. As described above, the file that is the target of the direct print may include a file in a file format other than the PDF format. If the file in a file format other than the PDF format is the file that is the target of the direct print, then in step S903, the CPU 201 executes a printing process for printing the file in the file format other than the PDF format.

On the other hand, as a result of the determination in step S902, if the PDF transmitted from the PC 110 is a PDF portfolio (YES in step S902), the processing proceeds to step S904. In step S904, the CPU 201 acquires a single file among files embedded in the PDF portfolio. Specifically, the CPU 201 analyzes the PDF portfolio and searches for a "'root''-'names'-'embedded files'-'names'" key illustrated in FIG. 6 (see the key item (names) 605). Then, the CPU 201 acquires one of the files embedded in the PDF portfolio from the items in the array of the key item (names) 605.

Next, in step S905, the CPU 201 analyzes the file acquired in step S904 and determines whether the file is a PDF file. For example, if the file acquired in step S904 includes the header 501 (see FIG. 5), the CPU 201 determines that the file is a PDF file. The determination method in step S905, however, is not limited to this method. For example, based on the extension of the file acquired in step S904, the CPU 201 may determine whether the file is a PDF file. In the present exemplary embodiment, in step S905, it is determined whether the file acquired in step S904 is in a predetermined file format.

As a result of the determination in step S905, if the file acquired in step S904 is not a PDF file (NO in step S905), the processing proceeds to step S906. In step S906, for example, the CPU 201 stores, in the RAM 203, information indicating that the file acquired in step S904 cannot be printed. Then, the processing proceeds to step S912. The information stored in step S906 will be used in step S913.

On the other hand, as a result of the determination in step S905, if the file acquired in step S904 is a PDF file (YES in step S905), the processing proceeds to step S907. In step S907, the CPU 201 analyzes the PDF file acquired in step S904 and determines whether the PDF file is encrypted. If the PDF file is encrypted, the CPU 201 determines whether a correct password is transmitted from the PC 110.

An example of the process of step S907 is described in detail below.

First, the CPU 201 analyzes the PDF file acquired in step S904 and searches for the table trailer 504. Then, if the table trailer 504 is found, the CPU 201 searches for the key item (encrypt) 512 in the table trailer 504 and checks the content of a key. Based on the content of the key, the CPU 201 determines whether the PDF file acquired in step S904 is encrypted. If the PDF file acquired in step S904 is encrypted, then based on the key item (P) 514, the CPU 201 determines whether printing is permitted. If printing is permitted, the CPU 201 further acquires a password from the key item (O) 515.

Then, the CPU 201 determines whether a password transmitted from the PC 110 and the password acquired from the PDF file acquired in step S904 match each other. If the password transmitted from the PC 110 and the password acquired from the PDF file acquired in step S904 match each other, the CPU 201 determines that the correct password is transmitted from the PC 110. If the PDF file acquired in step S904 is encrypted, and if a password is not transmitted from the PC 110, the CPU 201 determines that the correct password is not transmitted from the PC 110. If the PDF file is unencrypted, the CPU 201 does not determine whether a password is received and whether a received password is correct. Then, the processing proceeds to step S908.

As a result of the determination in step S907, if the PDF file acquired in step S904 is unencrypted, or if the correct password is transmitted from the PC 110 (NO in step S904), the processing proceeds to step S908. In step S908, for example, the CPU 201 stores, in the RAM 203, information indicating that the PDF file acquired in step S904 can be printed. Then, the processing proceeds to step S912.

On the other hand, as the result of the determination in step S907, if the PDF file acquired in step S904 is encrypted, and the correct password is not transmitted from the PC 110 (YES in step S907), the processing proceeds to step S909. In step S909, the CPU 201 displays a password entry screen on the operation unit 211.

The middle part of FIG. 10 illustrates an example of a password entry screen 1003. FIG. 10 illustrates the state where a message 1004 indicating that some PDF files in the PDF portfolio are encrypted is displayed on the password entry screen 1003. FIG. 10 illustrates an example of the state where a file name 1005 of an encrypted PDF file embedded in the PDF portfolio is displayed on the password entry screen 1003. FIG. 10 also illustrates a case where a password entry field 1006 is displayed on the password entry screen 1003. In this case, the user inputs a password to the password entry field 1006 and then presses an OK button 1007 by operating the operation unit 211.

The description returns to the flowchart in FIG. 9. In step S910, the CPU 201 determines whether the correct password is input to the password entry field 1006. If a password input to the password entry field 1006 and the password obtained by analysis of the PDF file acquired in step S904 match each other, the CPU 201 determines that the correct password is input to the password entry field 1006. A specific example of the determination method in step S910 is similar to the determination method in step S907, and therefore, the determination method in step S910 is not described in detail.

As a result of the determination in step S910, if the correct password is input (YES in step S910), the processing proceeds to step S908.

On the other hand, as the result of the determination in step S910, if the correct password is not input (NO in step S910), then in step S911, the CPU 201 stops the printing process and displays, on the operation unit 211, a message indicating that the print is stopped. The bottom right diagram of FIG. 10 illustrates a state where a message screen 1009 displayed on the operation unit 211 displays a message indicating that the printing is stopped because the password is wrong. If the user presses an OK button 1010 by operating the operation unit 211, the home screen 1001 is displayed again.

As described above, if the process of step S906 or S908 is completed, the processing proceeds to step S912.

In step S912, the CPU 201 analyzes the PDF portfolio and determines whether there is a file that has not yet been analyzed in the PDF portfolio.

As a result of the determination in step S912, if there is a file that has not yet been analyzed in the PDF portfolio (YES in step S912), the processing returns to step S904. Then, the processes of step S904 and the subsequent steps are performed again on the file that is embedded in the PDF portfolio and has not yet been analyzed.

On the other hand, as the result of the determination in step S912, if there is not a file that has not yet been analyzed in the PDF portfolio (NO in step S912), the processing proceeds to step S913. In step S913, the CPU 201 sequentially forms and prints an image based on a file determined as being printable among the files embedded in the PDF portfolio. A file that can be printed is identified based on the determination results in steps S906 and S908. If the printing process is completed, the CPU 201 displays, on the operation unit 211, a message indicating that the print is completed. The bottom left diagram of FIG. 10 illustrates the state where a message 1008 indicating "Test.pdf is printed" is displayed on the home screen 1001 displayed on the operation unit 211.

The example of the processing performed by the image forming apparatus 100 has been described above.

As described above, in the present exemplary embodiment, if a correct password as a password for an encrypted PDF file in a PDF portfolio is not input to a remote UI, the image forming apparatus 100 gives a notification to the user. Thus, when a PDF portfolio including an encrypted PDF file is subjected to direct print, and if a password corresponding to the encrypted PDF file is not input, the image forming apparatus 100 can notify the user of the state. It is desirable to give the notification to the user before an image to be printed is formed. This is because the user can be notified earlier. It is also desirable to give the notification to the user by a method different from printing. Then, it is not necessary to use a print sheet.

In the present exemplary embodiment, if a correct password as a password for an encrypted PDF file in a PDF portfolio is not transmitted from the PC 110, the image forming apparatus 100 prompts the user to input the password for the PDF file. Thus, even if the correct password as the password corresponding to the encrypted PDF file is not transmitted from the PC 110, the encrypted PDF file can be printed.

In the present exemplary embodiment, when the PC 110 gives an instruction to perform the direct print, the PC 110 prompts the user to input a password for an encrypted PDF file in a PDF portfolio.

Then, the PC 110 transmits the password input by the user to the image forming apparatus 100. Thus, the image forming apparatus 100 can determine whether the instruction to perform the direct print on the encrypted PDF file in the PDF portfolio is given by a user having authority over the PDF file, and execute print control depending on the result of the determination.

As described above, in the present exemplary embodiment, even if a part or all of printing data that can be partially encrypted is encrypted, it is possible to improve convenience of users when the printing data is subjected to the direct print.

The user can also give an instruction to perform the direct print on a PDF portfolio by inputting a Line Printer Remote (LPR) command using a command prompt, not using the remote UI. In a case where the direct print is performed using the LPR command, a password cannot be transmitted to the image forming apparatus 100, and a file is only transmitted to the image forming apparatus 100. An example of the processing performed by the image forming apparatus 100 in a case where the direct print is performed using the LPR command is similar to that in the flowchart in FIG. 9. Thus, the processing performed by the image forming apparatus 100 in this case is not described in detail.

The image forming apparatus 100 may display message screens 1101, 1102, and 1103 illustrated in FIGS. 11A to 11C instead of the password entry screen 1003 displayed in a case where a password is not transmitted from the PC 110.

If the PDF file acquired in step S904 is encrypted, and the correct password is not transmitted from the PC 110, the CPU 201 may stop printing of all the files in the PDF portfolio. In this case, for example, the CPU 201 displays the message screen 1101 illustrated in FIG. 11A on the operation unit 211. If the user presses an OK button 1111 by operating the operation unit 211, the display of the message screen 1101 ends.

For example, the message screen 1101 is displayed in step S909. In a case where the message screen 1101 is displayed, for example, the processes of steps S910 and S911 are not performed. If the process of step S909 is completed, the processing in the flowchart in FIG. 9 ends.

If the PDF file acquired in step S904 is encrypted, and the correct password is not transmitted from the PC 110, the CPU 201 may print only unencrypted files among the files included in the PDF portfolio. The encrypted files may be PDF files or other files.

In this case, for example, the CPU 201 displays the message screen 1102 illustrated in FIG. 11B on the operation unit 211. If an OK button 1112 is pressed, the CPU 201 ends the display of the message screen 1101.

For example, if the determination is YES once or more in step S907, the message screen 1102 is displayed after step S913. In a case where the message screen 1102 is displayed, for example, the processes of steps S909 to S911 are not performed. If the determination is YES in step S907, for example, the CPU 201 stores, in the RAM 203, information indicating that the PDF file cannot be printed. Then, the processing proceeds to step S912.

If the PDF file acquired in step S904 is encrypted, and the correct password is not transmitted from the PC 110, the CPU 201 may present, to the user, options for a process when the PDF portfolio is subjected to the direct print. Examples of the options include the processes described with reference to FIGS. 10, 11A, and 11B. In this case, for example, the CPU 201 displays the message screen 1103 illustrated in FIG. 11C on the operation unit 211. A case is illustrated where the message screen 1103 displays three options, namely the input of a password, the stop of printing of the PDF portfolio, and the printing of only unencrypted PDF files among the PDF files in the PDF portfolio. In this case, whether the PDF portfolio can be printed, and the content of the printing in a case where the PDF portfolio is printed are determined based on the result of selection of these options.

The message screen 1103 displays a password entry field 1114 in a similar manner to the password entry field 1006 illustrated in FIG. 10. For example, the message screen 1103 is displayed in step S909.

The user who wishes to input a password specifies a checkbox 1113a, inputs the password to the password entry field 1114, and then presses an OK button 1115 by operating the operation unit 211. By this operation, the CPU 201 performs processing similar to that in a case where the OK button 1007 is pressed after a password is input to the password entry field 1006 illustrated in FIG. 10.

The user who wants to stop the direct print specifies a checkbox 1113b and then presses the OK button 1115 by operating the operation unit 211. By the operation, the CPU 201 stops the printing process for printing the PDF portfolio.

In this case, for example, the processes of steps S910 and S911 are not performed. If the process of step S909 is completed, the processing in the flowchart in FIG. 9 ends. Alternatively, after the process of step S909, the message screen 1101 illustrated in FIG. 11A may be displayed.

The user who wants to print only files for which a password is not set among the files included in the PDF portfolio specifies a checkbox 1113c and then presses the OK button 1115 by operating the operation unit 211. By the operation, the CPU 201 performs a printing process for printing only the files for which a password is not set (unencrypted files) among the files included in the PDF portfolio.

In this case, for example, the processes of steps S910 and S911 are not performed. If the process of step S909 is completed, the processing proceeds to step S912. Further, after the process of step S912, the message screen 1102 illustrated in FIG. 11B may be displayed. If the OK button 1115 is pressed after the checkbox 1113c is specified in step S909, and if the determination is YES in step S907 after that, the process of step S909 may be omitted, and the processing may proceed to step S912.

If a cancel button 1116 is pressed on the message screen 1103 illustrated in FIG. 11C, the CPU 201 cancels the content of an input operation on the message screen 1103 and ends the display of the message screen 1103.

The user may specify, on the remote UI, the operation of the image forming apparatus 100 in a case where a correct password as a password for an encrypted PDF file is not available.

Figure 12:
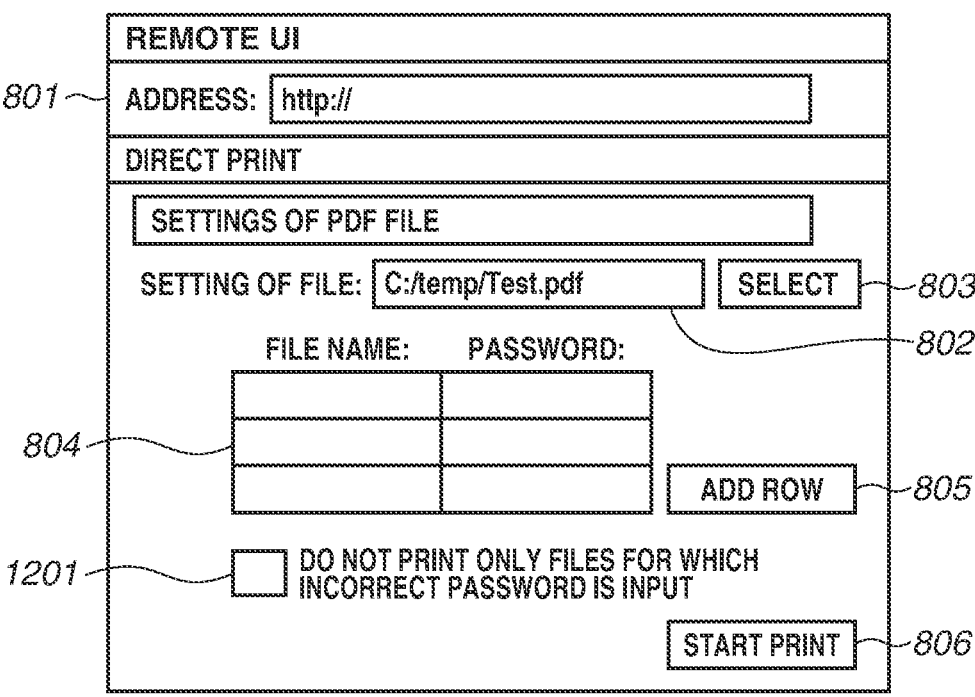
FIG. 12 is a diagram illustrating a modification of the GUI for giving an instruction to perform the direct print.

FIG. 12 is a diagram illustrating an example of a GUI which is a modification of the GUI for giving an instruction to perform the direct print and where the user can specify the operation of the image forming apparatus 100 in a case where a correct password is not input.

The remote UI screen 801 illustrated in FIG. 12 is obtained by addition of a checkbox 1201 to the remote UI screen 801 illustrated in FIG. 8A. If the user specifies the checkbox 1201 by operating the operation unit 211, the CPU 201 stops the printing process for printing the PDF portfolio, similarly to the case where the message screen 1102 is displayed. If, on the other hand, the checkbox 1201 is not specified, the CPU 201 prints only unencrypted files among the files included in the PDF portfolio, similarly to the case where the message screen 1101 is displayed. If the determination is YES in step S907, the CPU 201 determines whether the checkbox 1201 is selected. If the checkbox 1201 is selected, the CPU 201 does not perform the processes of steps S909 to S911, and stores information indicating that the file cannot be printed. Then, the processing proceeds to step S912. If, on the other hand, the checkbox 1201 is not selected, the CPU 201 executes steps S909 and S910. Depending on the result of step S910, the CPU 201 stores information indicating that the file can be printed or cannot be printed. Then, the processing proceeds to step S912.

In the present exemplary embodiment, the case has been illustrated where a printing target file that can be partially encrypted is a PDF portfolio. The printing target file, however, is not limited to a PDF portfolio. For example, the printing target file may be an image file in which a particular area in a single page is encrypted.

Next, a second exemplary embodiment is described. In the first exemplary embodiment, the case has been described where the image forming apparatus 100 determines whether a correct password as a password for an encrypted PDF file in a PDF portfolio is input (whether the correct password is transmitted from the PC 110). Then, if the correct password as the password for the encrypted PDF file in the PDF portfolio is not input, the image forming apparatus 100 gives a notification by displaying the password entry screen 1003. In contrast, in the present exemplary embodiment, an information processing apparatus that displays a remote UI determines whether a correct password as a password for an encrypted PDF file in a PDF portfolio is input. As described above, the present exemplary embodiment and the first exemplary embodiment are different from each other mainly in a configuration and processing due to a difference in the apparatus that determines whether a correct password as the password for the encrypted PDF file in the PDF portfolio is input. Thus, in the description of the present exemplary embodiment, portions identical to those in the first exemplary embodiment are designated by the same signs as those in FIGS. 1 to 11C, and are not described in detail.

Figure 13:
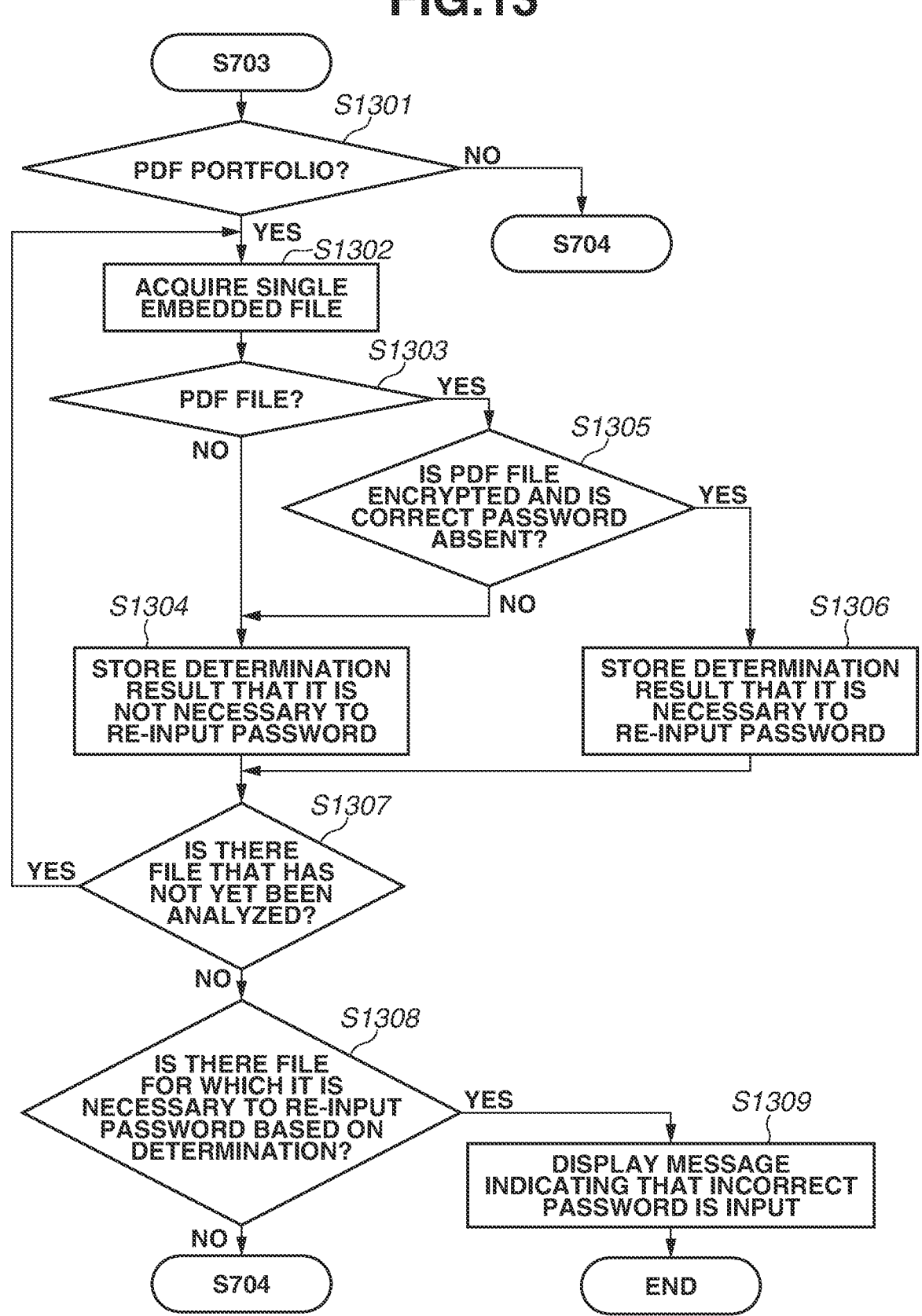
FIG. 13 is a flowchart illustrating a second example of the processing performed by the PC.

FIG. 13 is a flowchart illustrating an example of the processing performed by the PC 110 according to the present exemplary embodiment. The flowchart in FIG. 13 illustrates an example of a part of the processing until the PC 110 transmits a PDF to the image forming apparatus 100, and is performed at a timing between steps S703 and S704 in FIG. 7.

Also in the present exemplary embodiment, the PC 110 performs processes similar to the processes of steps S701 to S705 in FIG. 7. Also in the flowchart in FIG. 13, similarly to FIG. 7, a case is illustrated where a file as a target of direct print is a PDF.

If the CPU 301 specifies the start of print (if the user gives an instruction to perform the print) in step S703 in FIG. 7, then in step S1301, the CPU 301 in the PC 110 determines whether the file for which the start of the print is specified by the user is a PDF portfolio. An example of the determination method in step S1301 is similar to the determination method in step S902 in FIG. 9, and therefore is not described in detail here.

As a result of determination in step S1301, if the file that the user has given the instruction to print is not the PDF portfolio (NO in step S1301), the processing proceeds to step S704 in FIG. 7.

On the other hand, as the result of the determination in step S1301, if the file that the user has given the instruction to print is the PDF portfolio (YES in step S1301), the processing proceeds to step S1302. In step S1302, the CPU 301 acquires a single file among files embedded in the PDF portfolio. An example of the method for acquiring the file in step S1302 is similar to the method for acquiring the file in step S904 in FIG. 9, and therefore is not described in detail here.

Next, in step S1303, the CPU 301 determines whether the file acquired in step S1302 is a PDF file. An example of the determination method in step S1303 is similar to the determination method in step S905 in FIG. 9, and therefore is not described in detail here.

As a result of determination in step S1303, if the file acquired in step S1302 is not a PDF file (NO in step S1303), the processing proceeds to step S1304. In step S1304, the CPU 301 stores, in the RAM 303, for example, information indicating a determination result that it is not necessary to re-input a password for the file acquired in step S1302. If the process of step S1304 is completed, the processing proceeds to step S1307.

On the other hand, as the result of the determination in step S1303, if the file acquired in step S1302 is the PDF file (YES in step S1303), the processing proceeds to step S1305.

In step S1305, the CPU 301 analyzes the PDF file acquired in step S1302 and determines the following (a) and (b):

(a) whether the PDF file is encrypted, and (b) if the PDF file is encrypted, whether a correct password is input to the password entry field 804 for the PDF file.

An example of the determination method in step S1305 is obtained by replacement of "the password transmitted from the PC 110" with "the password input to the password entry field 804" in the description of an example of the determination method in step S907. Thus, the determination method in step S1305 is not described in detail here.

As a result of determination in step S1305, if the PDF file acquired in step S1302 is unencrypted, or if the correct password is input to the password entry field 804 (NO in step S1305), the processing proceeds to step S1304.

On the other hand, as the result of the determination in step S1305, if the PDF file acquired in step S1302 is encrypted, and the correct password is not input to the password entry field 804 (YES in step S1305), the processing proceeds to step S1306. In step S1306, the CPU 301 stores, in the RAM 303, for example, information indicating a determination result that it is necessary to re-input a password for the PDF file acquired in step S1302. Then, the processing proceeds to step S1307.

In step S1307, the CPU 301 analyzes the PDF portfolio and determines whether there is a file that has not yet been analyzed in the PDF portfolio. An example of the determination method in step S1307 is similar to the determination method in step S912, and therefore is not described in detail here.

As a result of determination in step S1307, if there is a file that has not yet been analyzed in the PDF portfolio (YES in step S1307), the processing returns to step S1302 described above. Then, the processes of step S1302 and the subsequent steps are performed again on the file that is embedded in the PDF portfolio and has not yet been analyzed.

On the other hand, as the result of the determination in step S1307, if there is not a file that has not yet been analyzed in the PDF portfolio (NO in step S1307), the processing proceeds to step S1308. In step S1308, the CPU 301 determines whether there is at least one file for which it is necessary to re-input a password based on determination.

As a result of determination in step S1308, if there is no file for which it is necessary to re-input a password based on the determination (NO in step S1308), the processing proceeds to step S704 in FIG. 7.

On the other hand, as the result of the determination in step S1308, if there is a file for which it is necessary to re-input a password based on the determination (YES in step S1308), the processing proceeds to step S1309. In step S1309, the CPU 301 displays, on the display unit 306, a message indicating that an incorrect password is input.

Figure 14:
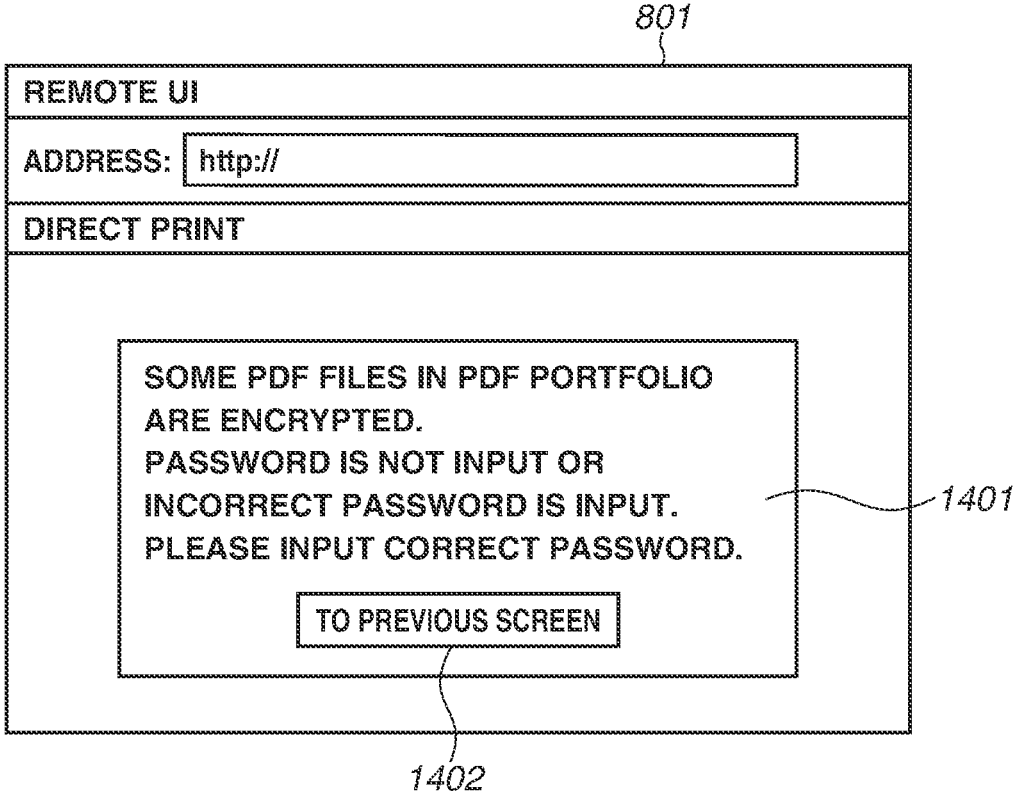
FIG. 14 is a diagram illustrating an example of display of a message indicating that an incorrect password is input.

FIG. 14 is a diagram illustrating an example of display of the message indicating that an incorrect password is input. FIG. 14 illustrates a case where the remote UI screen 801 illustrated in FIG. 8C displays the message indicating that an incorrect password is input. For example, suppose that when the remote UI screen 801 is in the state illustrated in FIG. 8B, there is a file for which it is necessary to re-input a password based on the determination in step S1308. In this case, for example, the CPU 201 changes the display content of the remote UI screen 801 illustrated in FIG. 8B to the display content of the remote UI screen 801 illustrated in FIG. 14.

In FIG. 14, the remote UI screen 801 displays a message 1401 indicating that an incorrect password is input. In the example illustrated in FIG. 14, the message 1401 prompts the user to re-input a password because an encrypted PDF file is included in the PDF portfolio and an incorrect password is input for the PDF file.

If the user presses a "To Previous Screen" button 1402 by operating the operation unit 308, the CPU 201 changes the display content of the remote UI screen 801 illustrated in FIG. 14 back to the display content of the remote UI screen 801 illustrated in FIG. 8B.

The description of an example of the processing according to the present exemplary embodiment until the PC 110 transmits a PDF portfolio to the image forming apparatus 100 has been described.

As described above, in the present exemplary embodiment, if a correct password as a password for an encrypted PDF file in a PDF portfolio is not input to a remote UI, the PC 110 gives a notification on the remote UI. Thus, when a PDF portfolio including an encrypted PDF file is subjected to the direct print, and even if a password corresponding to the encrypted PDF file is not input, the PC 110 can notify the user of the state.

The image forming apparatus 100 may determine whether the password for the encrypted PDF file in the PDF portfolio is the correct password. In this case, for example, the PC 110 transmits the PDF portfolio to the image forming apparatus 100 once. Then, for example, the CPU 201 of the image forming apparatus 100 performs processing including the processes of steps S1301 to S1303, S1305, S1307, and S1308 in the processing illustrated in FIG. 13 and returns information indicating the determination results of steps S1305 and S1308 to the PC 110. Then, the CPU 301 of the PC 110 performs the processes of steps S1304, S1306, and S1309 based on the information.

For example, the CPU 301 of the PC 110 may perform processes equivalent to the processes of steps S1301 to S1307 in the processing illustrated in FIG. 13, thereby automatically detecting and inputting an encrypted PDF file in a PDF portfolio. For example, "PDF2(encrypted).pdf" displayed in the password entry field 804 illustrated in FIG. 8B is not manually input by the user, but automatically input by the CPU 301. Then, if the CPU 301 detects that there is an encrypted PDF file in the PDF portfolio, the CPU 301 automatically displays the file name of the PDF file in the password entry field 804. In this case, the user only needs to input a password.

Also in the present exemplary embodiment, the various modifications described in the first exemplary embodiment may be employed.

In the second exemplary embodiment, the description has been given on the assumption that the information processing apparatus executes the processing illustrated in FIG. 13. The processing, however, does not necessarily need to be executed in this manner. For example, in step S704 in FIG. 7, the information processing apparatus may transmit the PDF to the image forming apparatus 100, and the image forming apparatus 100 may execute the processing illustrated in FIG. 13. In this case, if the determination is NO in step S1308, the image forming apparatus 100 performs the process of step S705. In step S1309, the image forming apparatus 100 transmits the remote UI screen 801 illustrated in FIG. 14 to the information processing apparatus and causes the information processing apparatus to display the remote UI screen 801.

Next, a third exemplary embodiment is described. In the first exemplary embodiment, the case has been described where a PDF portfolio is subjected to the direct print from the remote UI. In contrast, in the present exemplary embodiment, a case is described where a PDF portfolio is subjected to the direct print from a medium such as a USB memory. As described above, the present exemplary embodiment and the first exemplary embodiment are different from each other mainly in a configuration and processing due to a difference in a transmission source of a PDF as a target of the direct print. Thus, in the description of the present exemplary embodiment, portions identical to those in the first exemplary embodiment are designated by the same signs as those in FIGS. 1 to 11C, and are not described in detail.

Figure 15:
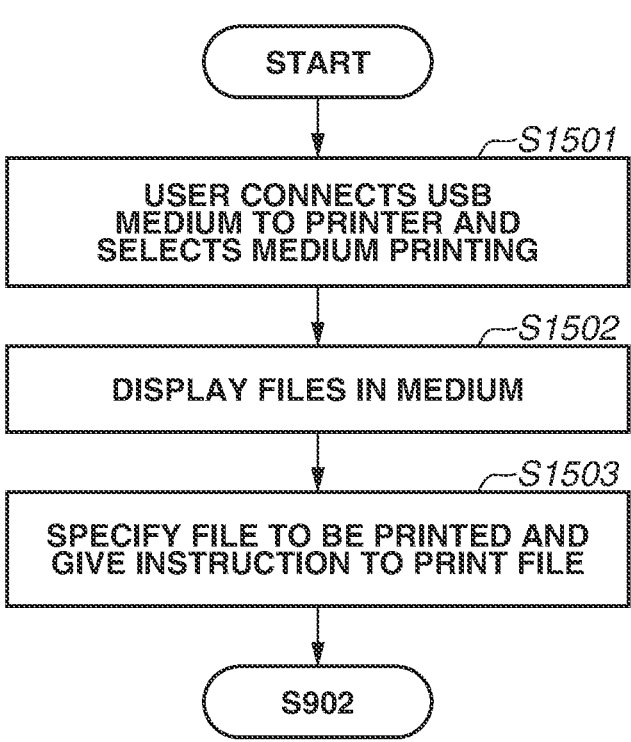
FIG. 15 is a flowchart illustrating a second example of the processing performed by the image forming apparatus.

FIG. 15 is a flowchart illustrating an example of the processing performed by the image forming apparatus 100 according to the present exemplary embodiment. The flowchart in FIG. 15 illustrates an example of a part of the processing performed by the image forming apparatus 100, and is performed instead of the process of step S901 in the flowchart in FIG. 9. Also in the present exemplary embodiment, the image forming apparatus 100 performs processes similar to the processes of steps S902 to S913 in FIG. 9. Also in the flowchart in FIG. 15, similarly to FIG. 9, a case is illustrated where a file as a target of the direct print is a PDF.

First, in step S1501, the user connects a USB medium that stores a PDF portfolio to the USB I/F 213 included in the image forming apparatus 100. Then, the user selects medium printing by operating the operation unit 211 of the image forming apparatus 100. The CPU 201 of the image forming apparatus 100 receives the selection.

Next, in step S1502, the CPU 201 displays files in the USB medium on the operation unit 211.

Next, in step S1503, the user specifies a file to be printed and gives an instruction to print the file by operating the operation unit 211. The CPU 201 receives the instruction.

If the process of step S1503 is completed, the process of step S902 in FIG. 9 is performed. The processes of step S902 and the subsequent steps are similar to those in the flowchart in FIG. 9, and therefore are not described in detail here.

As described above, in the present exemplary embodiment, if a correct password as a password for an encrypted PDF file in a PDF portfolio is not input for a file in a USB medium, the image forming apparatus 100 gives a notification. Thus, when a PDF portfolio stored in the USB medium is subjected to the direct print, and if the password corresponding to the encrypted PDF file in the PDF portfolio is not input, the image forming apparatus 100 can notify the user of the state.

Alternatively, the user may input the password for the encrypted PDF file in the PDF portfolio stored in the USB memory to the image forming apparatus 100. For example, in step S1503, the CPU 201 of the image forming apparatus 100 displays a GUI for inputting a password on the operation unit 211. The user inputs a password to the GUI by operating the operation unit 211. The CPU 201 makes the determination in step S907 using the password input to the GUI. In this manner, when a PDF portfolio stored in the USB memory is subjected to the direct print, the user can input the password corresponding to the encrypted PDF file in the PDF portfolio.

A storage medium that stores the information regarding the file that is the target of the direct print is not limited to the USB memory. For example, the storage medium that stores the information regarding the file that is the target of the direct print may be a flash memory other than the USB memory. Also in the present exemplary embodiment, the various modifications described in the first exemplary embodiment may be employed.

The present disclosure can also be achieved by a process of supplying a program for implementing one or more functions of the above-described exemplary embodiments to a system or an apparatus via a network or a storage medium, and of causing one or more processors of a computer of the system or the apparatus to read and execute the program. The present disclosure can also be achieved by a circuit (e.g., an application-specific integrated circuit (ASIC)) for implementing the one or more functions of the above-described exemplary embodiments.

All of the above-described exemplary embodiments of the present disclosure merely illustrate specific examples for carrying out the present disclosure, and the technical scope of the present disclosure should not be interpreted in a limited manner based on these exemplary embodiments. More specifically, the present disclosure can be carried out in various forms without departing from the technical idea or the main feature of the present disclosure.

For example, the above-described exemplary embodiments may be applied to a system including a plurality of devices, or may be applied to an apparatus composed of a single device. A computer program itself for implementing the functions of the above-described exemplary embodiments is also an exemplary embodiment. The computer program may be divided into a plurality of files, or may be encrypted. The computer program may be compressed.

According to the present disclosure, it is possible to improve convenience of users when encrypted data is subjected to the direct print.

Other Embodiments

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2022-076963, filed May 9, 2022, which is hereby incorporated by reference herein in its entirety.

What is claimed is:

1. An image forming system comprising:
at least one memory storing instructions; and
at least one processor operating to:
acquire a printing target file that can be partially encrypted;
give a notification in a case where an encrypted portion of the printing target file cannot be opened due to absence of decryption information;
print an image based on the printing target file not under control of a printer driver; and
in response to a user selection input received via the notification, selectively omit the encrypted portion from the printing target file and print the remaining portion,
wherein the notification comprises a user interface that includes options to (i) omit the encrypted portion and proceed with printing, or (ii) cancel the printing job.

2. The image forming system according to claim 1, wherein the printing target file is a file in which a plurality of files is combined into a single file and in which each of the plurality of files can be encrypted.

3. The image forming system according to claim 2, wherein the notification in a case where a file in a predetermined file format among the plurality of files cannot be opened.

4. The image forming system according to claim 1, wherein the acquires the printing target file a part of which is encrypted.

5. The image forming system according to claim 1, wherein the notification of information indicating that the printing target file includes the encrypted portion.

6. The image forming system according to claim 1, wherein the case where the encrypted portion cannot be opened includes a case where information to open the encrypted portion is not input.

7. The image forming system according to claim 1, wherein the notification before the image based on the printing target file is formed.

8. The image forming system according to claim 1,
wherein, in the case where the encrypted portion of the printing target file cannot be opened, perform display including information for receiving input of information to open the encrypted portion on a display, and
wherein, in a case where information input based on the information displayed is information to open the encrypted portion of the printing target file, prints an image based on the encrypted portion not under the control of the printer driver.

9. The image forming system according to claim 1, wherein the notification includes information describing a selectable process for handling the printing target file when the encrypted portion cannot be open.

10. The image forming system according to claim 9,
wherein, based on the selection input received via the notification, the printing is configured to wither (i) not print the image based on the printing target file,
or (ii) print only a portion of the printing target file that can be opened.

11. The image forming system according to claim 1,
wherein the notification includes a display of options for how to process the printing target file in response to a failure to open the encrypted portion, and wherein the process performed is based on a user selection of one of the options.

12. The image forming system according to claim 1, further comprising an image forming apparatus including the acquisition, the notification, and the printing.

13. The image forming system according to claim 12, further comprising an information processing apparatus including to transmit data including the printing target file to the image forming apparatus, wherein the received printing target file is transmitted.

14. The image forming system according to claim 12, wherein the acquisition unit acquires the printing target file stored in a storage medium connected to an interface of the image forming apparatus.

15. The image forming system according to claim 1, further comprising:

an image forming apparatus including the printing; and an information processing apparatus including the notification and to transmit data including the printing target file to the image forming apparatus.

16. An image forming apparatus comprising:

at least one memory storing instructions; and at least one processor operating to:

acquire a printing target file that can be partially encrypted;

give a notification in a case where an encrypted portion of the printing target file cannot be opened due to absence of decryption information;

print an image based on the printing target file not under control of a printer driver; and in response to a user selection input received via the notification, selectively omit the encrypted portion from the printing target file and print the remaining portion, wherein the notification comprises a user interface that includes options to (i) omit the encrypted portion and proceed with printing, or (ii) cancel the printing job.

17. The image forming apparatus according to claim 16, wherein the acquisition unit receives, from an external apparatus, the printing target file a part of which is encrypted.

18. An image forming method comprising:

acquiring a printing target file that can be partially encrypted;

giving a notification in a case where an encrypted portion of the printing target file cannot be opened due to absence of decryption information;

printing an image based on the printing target file not under control of a printer driver; and in response to a user selection input received via the notification, omitting selectively the encrypted portion from the printing target file and print the remaining portion, wherein the notification comprises a user interface that includes options to (i) omit the encrypted portion and proceed with printing, or (ii) cancel the printing job.

19. A non-transitory computer readable storage medium that stores instructions when executed cause an image forming apparatus to execute an image forming method, the image forming method comprising:

acquiring a printing target file that can be partially encrypted;

giving a notification in a case where an encrypted portion of the printing target file cannot be opened due to absence of decryption information;

printing an image based on the printing target file not under control of a printer driver; and in response to a user selection input received via the notification, omitting selectively the encrypted portion from the printing target file and print the remaining portion, wherein the notification comprises a user interface that includes options to (i) omit the encrypted portion and proceed with printing, or (ii) cancel the printing job.

* * * * *